Aug. 27, 1957     E. C. NELSON     2,803,876
KNIFE FOR CUTTING CHEESE AND THE LIKE
Filed Sept. 24, 1954
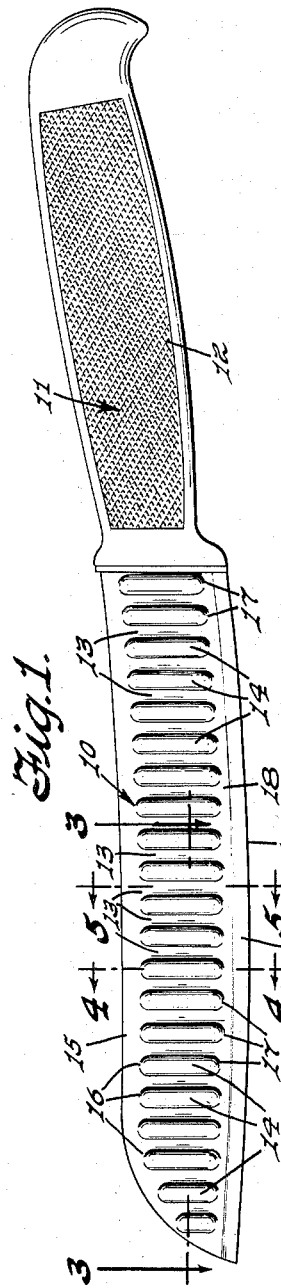
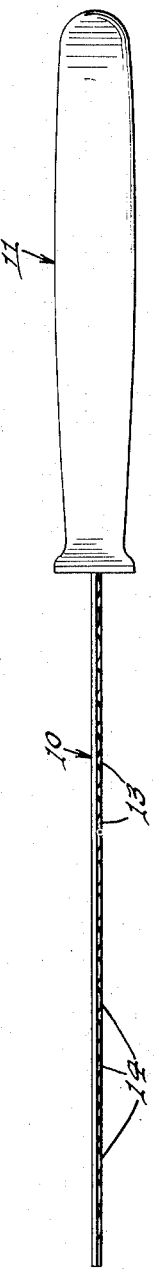
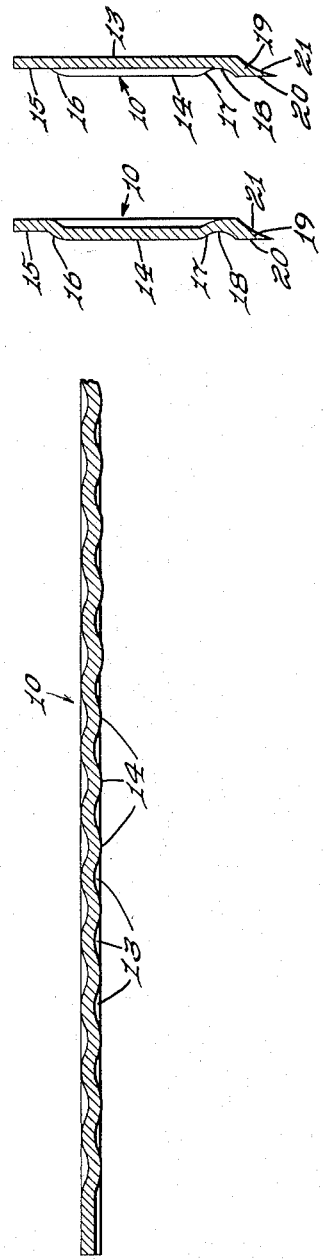
INVENTOR.
*Eustace C. Nelson*
BY *Victor J. Evans & Co.*
ATTORNEYS

United States Patent Office 2,803,876
Patented Aug. 27, 1957

2,803,876
KNIFE FOR CUTTING CHEESE AND THE LIKE

Eustace C. Nelson, Willow Springs, Mo.

Application September 24, 1954, Serial No. 458,037

1 Claim. (Cl. 30—115)

This invention relates to a knife, and more particularly to a knife for cutting cheese and the like.

The object of the invention is to provide a knife which will readily cut cheese or similar foodstuff without the cheese binding or sticking to the knife.

Another object of the invention is to provide a knife that includes a blade that has a plurality of spaced parallel vertically extending ribs or corrugations, there being a stiffening rib in the upper portion of the blade and wherein the lower edge of the blade is sharpened to provide a cutting edge, there being a handle arranged off center with respect to the longitudinal axis of the blade and secured thereto.

A further object of the invention is to provide a knife which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the cheese cutting knife, constructed according to the present invention.

Figure 2 is a top plan view of the knife.

Figure 3 is a sectional view taken on the line 3—3 of Figure 1.

Figure 4 is a sectional view taken on the line 4—4 of Figure 1.

Figure 5 is a sectional view taken on the line 5—5 of Figure 1.

Referring in detail to the drawings, the numeral 10 designates a blade of the knife which may be shaped arcuately or curved slightly as shown in Figure 1, and secured to an end of the blade 10 is a handle 11. The handle 11 may be provided with exterior knurling 12 whereby the handle can be more firmly gripped. The handle 11 is arranged off center with respect to the longitudinal axis of the blade 10, and due to the fact that the blade has a slightly curved shape, a rocking motion can be imparted thereto so as to facilitate slicing of cheese and the like.

The blade 10 is provided with a plurality of spaced parallel corrugations 14 which may be stamped out of one side of the blade 10 as shown in the drawings. These corrugations 14 define therebetween recesses or channels 13 which permit air to pass therethrough so that the cheese will not bind or stick to the knife as the knife cuts the cheese. In use the side of the blade 10 seen in Figure 1 contacts the block of cheese being sliced or cut.

The upper ends of the corrugations 14 terminate short of the top of the blade as shown in Figure 1 to thereby provide or define a stiffening rib 15. The upper ends of the corrugations 14 are rounded as at 16, while the lower ends of the corrugations 14 are rounded as at 17 and merge smoothly into the remaining portion of the blade.

Arranged adjacent the lower ends of the corrugations 14 is a longitudinally extending recess or groove 18, Figures 4 and 5. Positioned just below the groove 18 on the bottom of the blade 10 is a cutting edge 19 which extends longitudinally along the bottom of the blade. The surface 20 of the cutting edge 19 which is arranged contiguous to the block of cheese, is flat as shown in Figure 4, while the other surface 21 of the cutting edge 19 may be shaped arcuately.

From the foregoing it is apparent that there has been provided a knife which is especially suitable for slicing cheese or other foods or materials of a similar texture which have a tendency to bind on the knife. With the knife of the present invention cheese for table use can be sliced without the cheese binding to both sides of the knife such as is usually the case when a kitchen knife is used. This slicing is easily accomplished since air is permitted to enter between the cheese and the blade as soon as possible after any portion of the cheese is severed from the block and this entry of the air is permitted due to the provision of the longitudinal groove 18 and the lateral recesses 13 defined between the corrugations 14. Figure 1 is a view looking at the side which operates against the block of cheese and the present drawings illustrate a right handed knife. The corrugations 14 act as a fence or guide against the block of cheese. The overall thickness of the blade is approximately $\frac{1}{16}$ of an inch and the depth of corrugations and thickness of the upper part of the blade is approximately $\frac{1}{32}$ of an inch. The cutting edge 19, the longitudinal groove 18 and the stiffener rib 15 and vertical corrugations 14 are all approximately $\frac{1}{8}$ of an inch wide. The lower edge of the groove 18 forms a fairly sharp corner with the surface 20 to break the seal of the cheese from the blade. The edge 19 and raised corrugations 14 are in the same plane to provide a guide against the block of cheese so that only the corrugations 14 and surface 20 contact the block of cheese. The lower portions of the corrugations 14 are rounded as at 17 to prevent any scraping action which in time might clog the air spaces 13.

The knife is sharpened on a bevel towards the block of cheese side of the blade as shown in Figures 4 and 5 and this bevel is sufficient to roll the slice of cheese off the knife and as an added precaution to prevent the cheese from climbing the blade, the corrugations should extend as low as possible on the beveled side of the blade.

The blade 10 has a slightly curved edge with a raised handle 11 that is arranged off the center of the blade so that a downward rocking movement is permitted to completely sever the slice of cheese from the block. The ferrule is flush with the edge of the blade. A modified blade may have a straight cutting edge with the tang of the blade tilted upward to permit the handle to clear the fingers when cutting on a flat surface.

The air channels 13 are in the same plane as the stiffening rib 15, and with the knife of the present invention the cut is smooth and the corrugations serve as a riding or guiding surface with the air entering through the grooves or flutes 13. Also the knife will cut through cellophane or plastic wrapped cheese without any difficulty and the knife is constructed so that it includes a side which will function against the block of cheese to thereby require right and left handed knives for separate operations. Usually cheese and similar materials, when being cut with a knife have a tendency to stick to the knife at one side thereof, but with the knife of the present invention the slice being cut will not stick to the knife. The recess 18 and channels 13 permit air to enter between the cheese and the blade as soon as possible after the slice of cheese is being severed from the block.

The beveled edge is a necessary part as a blade sharpened from both sides is too hard to guide when cutting.

Thus, slices which may be very thin, can be cut with the beveled edge knife of the present invention.

I claim:

A knife for cutting cheese and the like comprising a blade of arcuate shape adapted to have a rocking motion imparted thereto, a handle secured to one end of said blade and arranged off center with respect to the longitudinal axis of the blade, said handle being provided with exterior knurling, said blade being provided with a plurality of straight spaced parallel transversely extending corrugations defining air channels therebetween, said corrugations extending outwardly from both sides of said blade in alternate relation to each other, said corrugations having their upper ends rounded and terminating short of the upper edge of the blade to define a stiffening rib, the lower edges of said corrugations being rounded and merging into a longitudinally extending groove, the lower edge of said blade providing a sharp cutting edge, said cutting edge having a flat surface positioned just below the groove on the same side of the blade as said groove and said cutting edge being shaped arcuately on the opposite side of said blade.

References Cited in the file of this patent
UNITED STATES PATENTS

| | | |
|---|---|---|
| 437,325 | Barclay | Sept. 30, 1890 |
| 1,484,755 | Black | Feb. 26, 1924 |
| 2,279,833 | Madan | Apr. 14, 1942 |
| 2,555,214 | Wallach et al. | May 29, 1951 |

FOREIGN PATENTS

| | | |
|---|---|---|
| 369,844 | Great Britain | Mar. 31, 1932 |
| 110,828 | Sweden | June 6, 1944 |
| 608,685 | Great Britain | Sept. 20, 1948 |